US011620727B2

(12) United States Patent
Yin et al.

(10) Patent No.: US 11,620,727 B2
(45) Date of Patent: Apr. 4, 2023

(54) IMAGE ANALYSIS WELL LOG DATA GENERATION

(71) Applicant: International Business Machines Corporation, Armonk, NY (US)

(72) Inventors: Kun Yan Yin, Ningbo (CN); Sheng Hui Zhan, Ningbo (CN); Wan Wan Miao, Ningbo (CN); Xun Wu, Ningbo (CN); Zi Yang Yu, Ningbo (CN); Jian Hui Chen, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 16/923,220

(22) Filed: Jul. 8, 2020

(65) Prior Publication Data

US 2022/0010675 A1 Jan. 13, 2022

(51) Int. Cl.
*E21B 47/00* (2012.01)
*E21B 47/12* (2012.01)
*G06K 9/62* (2022.01)
*G06N 3/02* (2006.01)
*G06T 3/00* (2006.01)
(Continued)

(52) U.S. Cl.
CPC ........ *G06T 3/0056* (2013.01); *E21B 47/0025* (2020.05); *E21B 47/12* (2013.01); *G01V 1/40* (2013.01); *G06K 9/6298* (2013.01); *G06N 3/02* (2013.01); *G06V 10/20* (2022.01); *G01V 2210/6163* (2013.01)

(58) Field of Classification Search
CPC ... E21B 47/0025; E21B 47/12; G06K 9/6298; G06N 3/02

USPC .......................................................... 702/85
See application file for complete search history.

(56) References Cited

U.S. PATENT DOCUMENTS 8,065,086 B2   11/2011   Yu et al.
2010/0094557 A1*   4/2010   Yu .......................... G01V 1/40
                                                                702/6
(Continued)

FOREIGN PATENT DOCUMENTS

WO      2014039512 A1    3/2014

OTHER PUBLICATIONS

Song et al., "Geologist-level wireline log shape identification with recurrent neural networks," Computers & Geosciences 134 (2020) 104313.

(Continued)

*Primary Examiner* — Jeffery A Williams
(74) *Attorney, Agent, or Firm* — Jared C. Chaney

(57) ABSTRACT

A well log is scanned for one or more dimensions that describe one or more features of a well. Each dimension includes a plurality of values in a numerical format that represents each dimension. A missing value is detected in a first plurality of values of a first dimension of the well log. The first dimension of the well log is transformed, in response to the missing value, into a first image that visually depicts the first dimension including the first plurality of values and the missing value. Based on the first image and based on an image analysis algorithm a second image is created that visually depicts the first plurality of values and includes a found depiction visually depicting a found value in place of the missing value. The found depiction is converted, based on the second image, into a first value in the numerical format.

20 Claims, 7 Drawing Sheets

(51) Int. Cl.
*E21B 47/002* (2012.01)
*G01V 1/40* (2006.01)
*G06V 10/20* (2022.01)

(56) References Cited

U.S. PATENT DOCUMENTS

2013/0110486 A1* 5/2013 Polyakov ............... E21B 49/00
  703/10
2019/0293818 A1  9/2019 Meek
2019/0368316 A1  12/2019 Bize-Forest et al.

OTHER PUBLICATIONS

Banchs et al., "Nonlinear estimation of missing logs from existing well log data," SEG Technical Program Expanded Abstracts, Jan. 2001, pp. 2135. (Summary Only) https://library.seg.org/doi/pdfplus/10.1190/1.1816689.

Saggaf et al., "Estimation of missing logs by regularized neural networks," Search Article, AAPG Bulletin, vol. 87 No. 8, pp. 1377-1389, Aug. 2003. (Abstract Only) https://pubs.geoscienceworld.org/aapgbull/article-abstract/87/8/1377/40100.

* cited by examiner

IMAGE ANALYSIS WELL LOG DATA GENERATION

BACKGROUND

The present disclosure relates to geological data generation, and more specifically, to filling missing values of well logs based on image processing.

Well logs provide data for geological research. The well logs may include one or more dimensions that describe various features of well logs. Sometimes the well logs may have gaps or missing values for specific segments of the various dimensions. The missing values may make it difficult to derive geological information about the well.

SUMMARY

According to embodiments, disclosed are a method, system, and computer program product.

A well log is scanned for one or more dimensions. The one or more dimensions describe one or more features of a well, each dimension of the well log corresponds to each feature, each dimension includes a plurality of values in a numerical format that numerically represents each dimension. A missing value is detected in a first plurality of values of a first dimension of the well log. The first dimension of the well log is transformed, in response to the missing value, into a first image. The first image visually depicts the first dimension including the first plurality of values and the missing value. A second image is created based on the first image and based on an image analysis algorithm. The second image visually depicts the first plurality of values and a found depiction that visually depicts a found value in place of the missing value. The found depiction of the found value is converted, based on the second image, into a first value. The first value is in the numerical format.

In some embodiments, the transforming includes transforming the one or more dimensions other than the first dimension into the first image, and the first image visually depicts the one or more dimensions in addition to visually depicting the first dimension.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
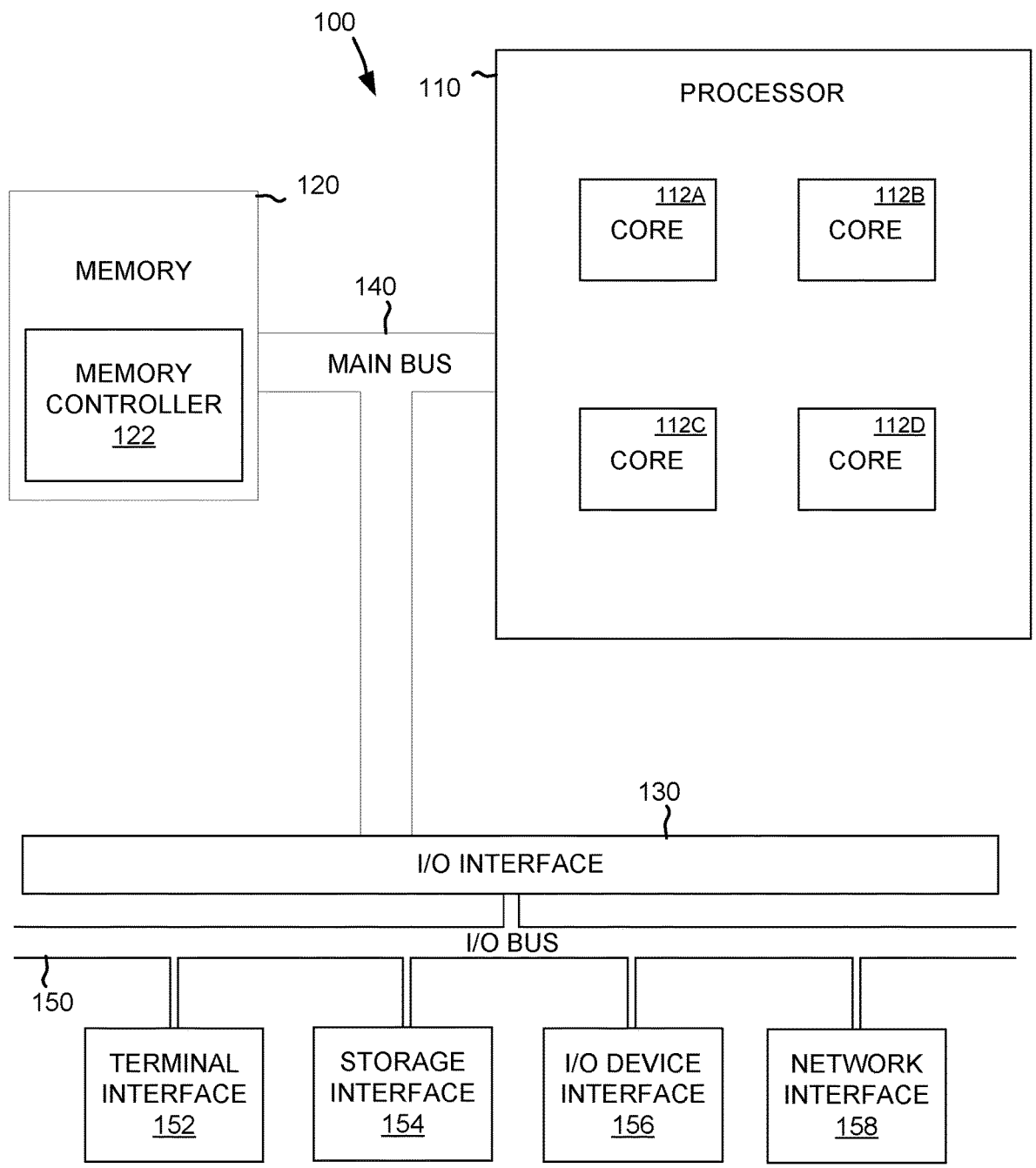
FIG. 1 depicts the representative major components of an example computer system 100 (alternatively, computer) that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to geological data generation; more particular aspects relate to filling missing values of well logs based on image processing. While the present disclosure is not necessarily limited to such applications, various aspects of the disclosure may be appreciated through a discussion of various examples using this context.

In geologic research, wells may include various geological features. A nonexclusive list of geological features may include Gamma Ray, Spontaneous Potential, Resistivity, Density, Neutron Porosity, Depth, and the like. These features may vary along a depth value of a well. For example, at 150 feet, the value of the Neutron Porosity may be different than at 185 feet. The features of a well may be studied to try and determined and understand complex geological conditions regarding the well (e.g., the presence of water, the likelihood of finding a mineral deposit).

Well data may be recorded in the format of well logs. For instance, at a regular interval, data may be recorded in a well log. The well log may have one or more dimensions that correspond to the one or more features of a given well. The well logs may be kept together chronologically as a series of historical well logs. Unfortunately, in many instances, it is common for a well log to have one or more missing values for a given dimensions. The missing values may be due various situations, such as sensor faults or network connectivity issues.

One technique to fill the missing values in well log data is to have geologists estimate the missing values using one or more numerical techniques. Specifically, a user may employ a geological software suite that is configured to perform mathematical operations. In a first example, mathematical operations may include calculation of the average numerical value of a given dimension of a well log. In a second example, geological software may estimate based on a first dimension and other multiple examples the first dimension of the discovered on historical well log data.

There are a few drawbacks to the use of mathematical software. One issue is that geological software may only be able to perform simple calculations (e.g., mean, median) of various dimensions of well logs. The various dimensions are potentially interconnected with other dimensions such that performing only an analysis of a single feature (by analysis of the corresponding dimension), may lead to inaccurate data. Another issue is that as each well is unique, it may not be defined solely by performing a mathematical analysis of the dimensions that corresponds to the various features. Specifically, an algorithm or mathematical relationship that yields somewhat reliable data for a first well, may yield faulty, misleading, or otherwise inaccurate data for another well.

Often it may be necessary to employ geologists to try and impart their intuitions into the well log data and historical well log datasets to try and come up with a mathematical explanation for a specific well. While it is potentially possible to perform manual research and calculations, practically speaking it may be impossible for multiple reasons. First, it can be time-consuming for a team of geologists to discover the relationship between different parameters for each and every well that mining companies may wish to explore or extract minerals. Mineral extraction efforts may, consequently, be delayed an unreasonable time while waiting for manual calculations. Second, there are certain areas where well data is time sensitive, due to changing conditions. For example, an area set for mineral extraction may be suffering from erosion, and miners may need data calculations performing in real-time or near real-time to make a determination on mining or drilling, and geological experts may not be able to practically calculate or determine a relationship for a given well. This may lead to inaccurate or faulty data as geologists may have to make best guesses as to whether certain features and properties of well are true given missing well data values.

Image analysis-based well log data generation (IWG) may overcome the issues of other techniques to fill in missing well log data. An IWG may perform image analysis to detect and fill in missing well log data. The IWG may operate by scanning the plurality of values that make up each dimension of a given well log. For every dimension, the IWG may be configured to scan for missing values in the dimensions (e.g., a series of blanks, null values, uninitialized values). If a missing value is detected in the scan, the IWG may be configured to convert the dimension that has missing values into a visual representation. For example, the IWG may draw a visual representation of a dimension that has missing values as a well log curve. The IWG may then perform one or more image analysis techniques to the generated image. The image analysis techniques may include one or more neural networking or machine learning techniques to detect, analyze, and identify portions of an image. Based on these techniques, the IWG may create a complete well log, that has found values. The found values may be in a depicted format (e.g., a found depiction) that visually illustrates what the missing values would be. For example, given a well log curve that has a gap or missing portion, the generated image may include a complete curve with a found portion or found depiction that represents found values for use in the well log. The IWG may also be configured to translate found depiction of the dimension that was previously missing into a numerical format for further use or analysis by a geological entity (e.g., a surveyor).

The visual nature of the data may lead to practical benefits, such as easy analysis and checking by a geologist or a worker at a geological entity (e.g., a mining company). The found depiction may also be converted into a numerical format for use by a geological entity for performing one or more mining operations or other numerical-based analysis. The IWG may generate a complete well log with a lower overhead or a reduced use of computing resources. The IWG may generate a well log that has fewer erroneous estimates and provides more accuracy. Specifically, because the image analysis techniques leveraged by the IWG analysis generate a new image based on the entirety of the visual representation of the dimensions of a well log, the IWG may generate the missing data based on the entire set of values of each of the dimensions present in the well log. Further, use of the IWG to reconstruct the missing values may allow for quick verification or refining of existing numerical techniques. For example, a geological expert can quickly verify that a mathematical relationship between one feature of a well and another feature of the well are accurate in a simulation by comparing the output of the simulation to the created depiction of the well log data from the IWG.

The IWG may rely on one or more image processing and image analysis techniques. Image processing and image analysis may leverage an image processor (not depicted). The image processor may be a collection of hardware and software, such as an application specific integrated circuit.

The image processor may be configured to perform various image analysis techniques. The image analysis techniques may be machine learning and/or deep learning-based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a dimension of a well log visually represented in a well log curve. For example, a well log curve may be a non-breaking, continuous, or nearly continuous line that visually depicts one or more values of a well log. Image analysis may be used from the image processor to identify, isolate, extract, separate, or otherwise select a single curve depicted in a well log curve.

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a well log curve may be analyzed. Using a relevant object detection algorithm, one or more values of a dimension that was generated by the IWG may be identified.

In some embodiments, features of the objects may be determined using a supervised machine learning model built using training data. For example, an image may be input into the supervised machine learning model and various classifications detected within the image can be output by the model. For example, characteristics such as shape, size, slope, curvature, and other characteristics may be output by the supervised machine learning model. Further, the identification of objects (e.g., increasing curves, separate between two different curves, etc.) can be output as classifications determined by the supervised machine learning model.

Characteristics may include the shapes of objects, dimensions (e.g., height, length, and width) of objects, a number of objects (e.g., relative curvature of a given representation of a dimension of a well log in a well log curve), colors of objects, and/or other attributes of objects. In some embodiments, the output may generate a list including the identity and/or characteristics of objects (e.g., Density curve, Porosity curve, etc.). In some embodiments, the output may include an indication that an identity or characteristic of an object is unknown. In some embodiments, various objects, object attributes, and relationships between objects (e.g., hierarchical and direct relations) may be represented within a knowledge graph (KG) structure. Objects may be matched to other objects based on shared characteristics (e.g., a first portion of a curve based on a line thickness, line pattern, or line shape), relationships with other objects (e.g., a first portion of a well log curve may be related to a second portion), or objects belonging to the same class, and the like.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100— including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
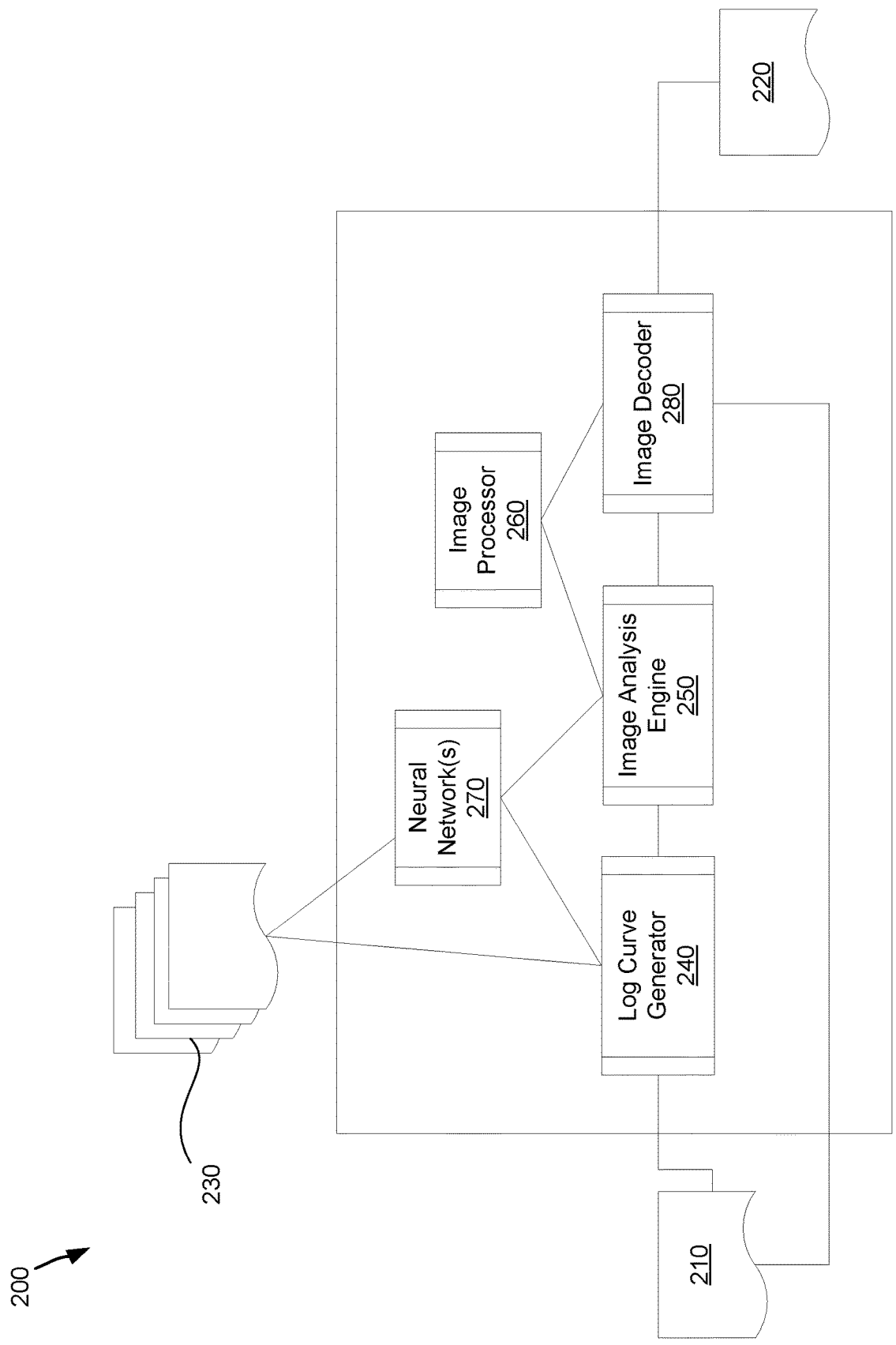
FIG. 2 depicts an example system for performing image analysis-based well log data generation (IWG), consistent with some embodiments of the disclosure.

FIG. 2 depicts an example system 200 for performing image analysis-based well log data generation (IWG), consistent with some embodiments of the disclosure. System 200 may operate on a computer, such as computer 100. System 200 may operate based on analysis of a well log 210. Well log 210 may relate to a well and the data in well log 210 may include one or more dimensions that relate to the one or more features of the well. System 200 may also operate by generating an updated well log 220. The updated well log 220 may include the value that was found based on image analysis of the IWG (alternatively, the found value). Further system 200 may also operate based on a set of training data 230. System 200 may include the following: a log curve generator 240, an image analysis engine 250, and an image decoder 280.

Log curve generator 240 may be software, such as one or more algorithms or processes designed and configured to process well logs from input, such as well log 210. Log curve generator 240 may be configured to run on a computer system, such as computer 100. Log curve generator 240 may be hardware, such as a fixed function microprocessor designed and configured to process well logs. In some embodiments, the log curve generator 240 may include a combination, hardware, software, firmware, and the like configured for generating visual curves from mathematical values. Specifically, well log 210 may include one or more dimensions that describe the features of a well. The dimensions may be in a numerical format that represents each dimension (e.g., a series of numbers, one or more measurements). The log curve generator 240 may input the one or more dimensions into an image. The image may visually depict or otherwise represent with image data the one or more dimensions. In some embodiments, the log curve generator 240 may scan the well log 210 for a missing value in each of the one or more dimensions. For example, the log curve generator 240 may scan for a missing value. Upon detection of the missing value, the log curve generator 240 may transform the dimension with the missing value into an image. The log curve generator 240 may optionally transform or not transform the other dimensions (the dimensions not having missing values) into the image in addition to the dimension with the missing value.

Image analysis engine 250 may be software, such as one or more algorithms or processes designed and configured to analyze images that depict dimensions of the well log 210. Image analysis engine 250 may be configured to run on a computer system, such as computer 100. Image analysis engine 250 may be hardware, such as a fixed function microprocessor designed and configured to process well logs. The image analysis engine may leverage image analysis techniques of image processor 260. In some embodiments, the image analysis engine 250 may include a combination, hardware, software, firmware, and may leverage one or more machine learning techniques. Image analysis engine 250 may be configured to leverage neural network 270 to perform inpainting on the image generated by log curve generator 240. Inpainting may be a technique of digitally reconstructing a missing portion of an image. Neural network 270 may be one or more neural networks configured to identify and classify various gaps or missing graphical elements of an image. Neural network 270 may be trained based on the set of training data 230. Neural network 270 may use historical well logs for the set of training data 230. The historical well logs may be well logs for the same well as the well log 210. The historical well logs may contain features represented numerically as dimensions and the neural network 270 may perform training based on these dimensions (e.g., based on curves drawn by log curve generator 240 for each of the historical well logs). In some embodiments, neural network 270 may perform a visual reconstruction of the well log 210 for each permutation of the dimensions to generate training data without the presence of any historical data.

Neural network 270 may further be configured to output, reconstruct, find, or otherwise visually recreate a portion of an image that is missing (e.g., a found depiction). Image analysis engine 250 may perform various calls to neural network 270 to perform a complex neural-network-based technique to fill in or determine the missing parts. For example, image analysis engine 250 may perform one or more steps of a combining Markov Random Fields and Convolutional Neural Networks (CNNMRF) technique. In some embodiments, the analysis engine 250 may perform one or more steps of Context-Encoders+CNNMRF techniques. The image analysis engine 250 may perform other image analysis techniques to smooth, feather, shade, incorporate, or otherwise style the found values and create a second image with the found depiction in the second image.

Image decoder 280 may be software, such as one or more algorithms or processes designed and configured to generate an output, such as updated well log 220. Image decoder 280 may be configured to run on a computer system, such as computer 100. Image decoder 280 may be hardware, such as a fixed function microprocessor designed to perform image detection and image analysis. Image decoder 280 may leverage image processor 260 to output updated well log 220. For example, image decoder 280 may received the second image from the image analysis engine 250. The image decoder 280 may perform feature detection, image recognition, or another relevant technique in conjunction with image processor 260. Image decoder 280 may output numerical values in a format similar to well log 210 for updated well log 220. For example, curves that match a first dimension will be identified and classified as the first dimension in both the well log 210 and the updated well log 220. The image decoder 280 may copy the precision, units, data type, or other format of the numbers from the well log 210 to output the updated well log 220.

Figure 3:
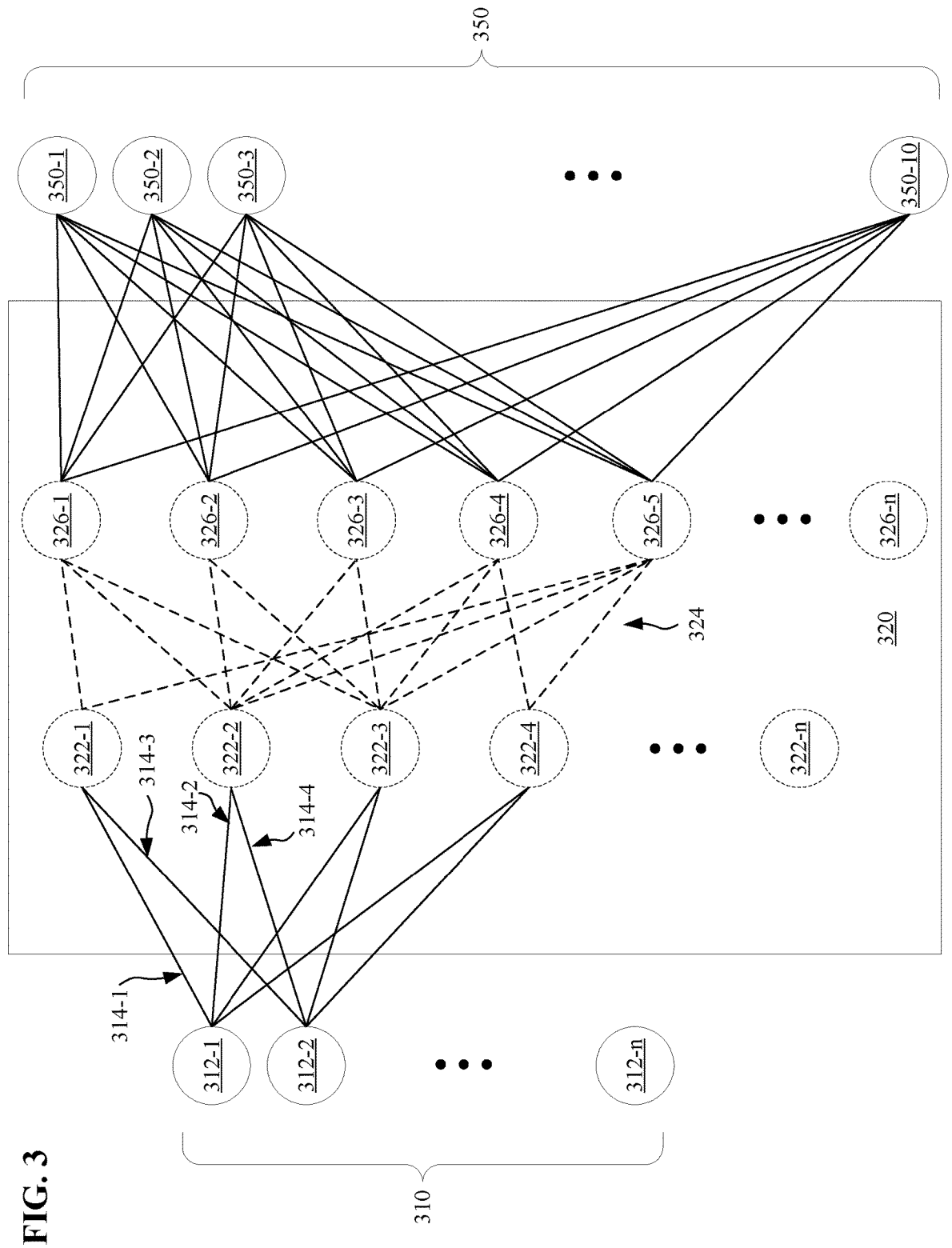
FIG. 3 depicts a model representative of one or more artificial neural networks capable of performing image analysis, consistent with some embodiments of the present disclosure.

FIG. 3 depicts a model 300 representative of one or more artificial neural networks capable of performing image analysis, consistent with some embodiments of the present disclosure. Model 300 may be representative of neural network 270 of FIG. 2. Model 300 may be representative of a component or portion of neural network 270. For example, model 300 may represent one or more of the neural networks that perform various loss functions of a multi-network set of operations of neural network 270. For example, model 300 may be representative of a neural network configured to perform a loss function that is a holistic content loss function. In another example, model 300 may be representative of a neural network configured to perform a loss function that is a local texture loss function.

The model neural network (alternatively, neural network) 300 is made up of a plurality of layers. The neural network 300 includes an input layer 310, a hidden section 320, and an output layer 350. Though model 300 depicts a feed-forward neural network, other neural networks layouts may also be contemplated such as a recurrent neural network layout (not depicted). In some embodiments, the neural network 300 may be a design-and-run neural network and the layout depicted by the model may be created by a computer programmer. In some embodiments, the neural network 300 may be a design-by-run neural network and the layout depicted may be generated by the input of data and by the process of analyzing that data according to one or more defined heuristics. The neural network 300 may operate in a forward propagation by receiving an input and outputting a result of the input. The neural network 300 may adjust the values of various components of the neural network by a backward propagation (back propagation).

The input layer 310 includes a series input neuron 312-1, 312-2, up to 312-n (collectively, 312) and a series of input connections 314-1, 314-2, 314-3, 314-4, etc. (collectively, 314). The input layer 310 represents the input from data that the neural network 300 is supposed to analyze (e.g., a digitized picture or well logs). Each input neuron 312 may represent a subset of the input data. For example, the neural network 300 is provided with a well log image as input, and the dimensions of the well log is represented by a series of pixels. In this example, input neuron 312-1 may be the first pixel of the picture, input neuron 312-2 may be the second pixel of the picture, etc. The number of input neurons 312 may correspond to the size of the input. For example, when the neural network is designed to analyze images that are 256 pixels by 256 pixels, the neural network 300 layout may include a series of 65,536 input neurons. The number of input neurons 312 may correspond to the type of input. For example when the input is a color image that is 256 pixels by 256 pixels, the neural network 300 layout may include a series of 196,608 input neurons (65,536 input neurons for the red values of each pixel, 65,536 input neurons for the green values of each pixel, and 65,536 input neurons for the blue values of each pixel). The type of input neurons 312 may correspond to the type of input. In a first example, the neural network 300 may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, the neural network 300 may be designed to analyze images that are color, and each of the input neurons may be a three dimensional vector to represent the color values of a given pixel of the input images (where the first component of the vector is an red whole-number value between 0 and 255, the second component of the vector is an green whole-number value between 0 and 255, and the third component of the vector is an red whole-number value between 0 and 255).

The input connections 314 represents the output of the input neurons 312 to the hidden section 320. Each of the input connections 314 vary depending on the value of each input neuron 312 and based upon a plurality of weights (not depicted). For example, the first input connection 314-1 has a value that is provided to the hidden section 320 based on the input neuron 312-1 and a first weight. Continuing the example, the second input connection 314-2 has a value that is provided to the hidden section 320 based on the input neuron 312-1 and a second weight. Further continuing the example, the third input connection 314-3 based on the input neuron 312-2 and a third weight, etc. Alternatively stated, the input connections 314-1 and 314-2 share the same output component of input neuron 312-1 and the input connections 314-3 and 314-4 share the same output component of input neuron 312-2; all four input connections 314-1, 314-2, 314-3, and 314-4 may have output components of four different weights. Though the neural network 300 may have different weightings for each connection 314, some embodiments may contemplate weights that are similar. In some embodiments, each of the values of the input neurons 312 and the connections 314 may necessarily be stored in memory.

The hidden section 320 includes one or more layers that receive inputs and produce outputs. The hidden section 320 includes a first hidden layer of calculation neurons 322-1, 322-2, 322-3, 322-4, up to 322-$n$ (collectively, 322); a second hidden layer of calculation neurons 326-1, 326-2, 326-3, 326-4, 326-5, up to 326-$n$ (collectively 326); and a series of hidden connections 324 coupling the first hidden layer and the second hidden layer. It should be appreciated that model 300 only depicts one of many neural networks capable of filling missing values of dimensions of a well log consistent with some embodiments of the disclosure. Consequently, the hidden section 320 may be configured with more or less hidden layers (e.g., one hidden layer, seven hidden layers, twelve hidden layers, etc.)—two hidden layers are depicted for example purposes.

The first hidden layer 322 includes the calculation neurons 322-1, 322-2, 322-3, 322-4, up to 322-$n$. Each calculation neuron of the first hidden layer 322 may receive as input one or more of the connections 314. For example, calculation neuron 322-1 receives input connection 314-1 and input connection 314-2. Each calculation neuron of the first hidden layer 322 also provides an output. The output is represented by the dotted lines of hidden connections 324 flowing out of the first hidden layer 322. Each of the calculation neurons 322 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tan h neurons, softplus functions, softmax functions, rectified linear units, etc.). In some embodiments, each of the calculation neurons 322 also contains a bias (not depicted). The bias may be used to decide the likelihood or valuation of a given activation function. In some embodiments, each of the values of the biases for each of the calculation neurons must necessarily be stored in memory.

An example of model 300 may include the use of a sigmoid neuron for the activation function of calculation neuron 322-1. An equation (Equation 1, stated below) may represent the activation function of calculation neuron 312-1 as f(neuron). The logic of calculation neuron 322-1 may be the summation of each of the input connections that feed into calculation neuron 322-1 (i.e., input connection 314-1 and input connection 314-3) which are represented in Equation 1 as j. For each j the weight w is multiplied by the value x of the given connected input neuron 312. The bias of the calculation neuron 322-1 is represented as b. Once each input connection j is summed the bias b is subtracted. Finalizing the operations of this example as follows: given a larger positive number results from the summation and bias in activation f(neuron), the output of calculation neuron 322-1 approaches approximately 1; given a larger negative number results from the summation and bias in activation f(neuron), the output of calculation neuron 322-1 approaches approximately 0; and given a number somewhere in between a larger positive number and a larger negative results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer 326 includes the calculation neurons 326-1, 326-2, 326-3, 326-4, 326-5, up to 326-$n$. In some embodiments, the calculation neurons of the second hidden layer 326 may operate similarly to the calculation neurons first hidden layer 322. For example, the calculation neurons 326-1 to 326-$n$ may each operate with a similar activation function as the calculation neurons 322-1 to 322-$n$. In some embodiments, the calculation neurons of the second hidden layer 326 may operate differently to the calculation neurons of the first hidden layer 322. For example, the calculation neurons 326-1 to 326-$n$ may have a first activation function, and the calculation neurons 322-1 to 322-$n$ may have a second activation function.

Likewise, the connectivity to, from, and between the various layers of the hidden section 320 may also vary. For example, the input connections 314 may be fully connected to the first hidden layer 322 and hidden connections 324 may be fully connected from the first hidden layer to the second hidden layer 326. In embodiments, fully connected may mean that each neuron of a given layer may be connected to all the neurons of a previous layer. In embodiments, fully connected may mean that each of neuron of a given layer may function completely independently and do not share any connections. In a second example, the input connections 314 may not be fully connected to the first hidden layer 322 and the hidden connections 324 may not be fully connected from the first hidden layer to the second hidden layer 326.

Also, likewise, the parameters to, from, and between the various layers of the hidden section 320 may also vary. In some embodiments, the parameters may include the weights and the biases. In some embodiments, there may be more or fewer parameters than the weights and biases. For example, the model 300 may be of a convolutional network. The convolutional neural network may include a sequence of heterogeneous layers (e.g., an input layer 310, a convolution layer 322, a pooling layer 326, and an output layer 350). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, a portion of a well log curve in a visual depict of twenty dimensions of a well log, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 350 includes a series of output neurons 350-1, 350-2, 350-3, up-to 350-$n$ (collectively, 350). The output layer 350 holds a result of the analyzation of the neural network 300. In some embodiments, the output layer 350 may be a categorization layer used to identify a feature of the input to the neural network 300. For example, the neural network 300 may be a classification network trained to identify Arabic numerals. In such an example, the neural network 300 may include ten output neurons 350 corresponding to which Arabic numeral the network has identified (e.g., output neuron 350-2 having a higher activation value than output neurons 350 may indicate the neural network determined an image contained the number '1'). In some embodiments, the output layer 350 may be a real-value target (e.g., trying to predict a result when an input is a previous set of results) and there may be only a singular output neuron (not depicted). The output layer 350 is fed from an output connection 352. The output connection 352 provides the activations from the hidden section 320. In some embodiments, the output connections 352 may include weights and the output neurons 350 may include biases.

Training the neural network depicted by the model 300 may include performing back propagation. Back propagation is different from forward propagation. Forward propagation may include feeding of data into the input neurons 310; performing the calculations of the connections 314, 324, 352; and performing the calculations of the calculation neurons 322 and 326. The forward propagation may also be the layout of a given neural network (e.g., recurrence, number of layers, number neurons in one or more layers, layers being fully connected or not to other layers, etc.). Back propagation may be determining an error of the parameters (e.g., the weights and the biases) in the neural network 300 by starting with the output neurons 350 and propagating the error backward through the various connections 352, 324, 314 and layers 326, 322, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination. For example, neural network 300 may be a classification network; may be provided with a 128 pixel by 250 pixel image input that contains the a curve with one or more missing dimension of a well log reconstructed as a one or more found depictions; and may determine that a first found depiction of a missing portion is most likely a straight line and is second most likely zig-zag line and is third most likely a gentle curved line (and so on with the other missing portions). Continuing the example, performing a back propagation may alter the values of the weights of connections 314, 324, and 352; and may alter the values of the biases of the first layer of calculation neurons 322, the second layer of calculation neurons 326, and the output neurons 350. Further continuing the example, the performance of the back propagation may yield a future result that is a more accurate classification of the same 128 pixel by 250 pixel image input that contains the first found depiction (e.g., more closely ranking the gentle curve, straight line, then zig-zag line in order of most likely to least likely, etc.).

Equation 2 provides an example of the objective function in the form of a quadratic cost function (e.g., mean squared error)—other functions may be selected, and the mean squared error is selected for example purposes. In Equation 2, all of the weights w and biases b of an example network. The example network is provided a given number of training inputs n in a subset (or entirety) of training data that have input values x. The example network may yield output a from x and should yield a desired output y(x) from x. Back propagation or training of the example network should be a reduction or minimization of the objective function 'O(w,b)' via alteration of the set of weights and biases. Successful training of the example network should not only include the reduction of the difference between the example network's answer a and the correct answers y(x) for the input values x, but given new input values (e.g., from additional training data, from validation data, etc.).

$$O(w, b) \equiv \frac{1}{2n}\sum_x \|y(x) - a\|^2 \qquad \text{Equation 2}$$

Many options may be utilized for back propagation algorithms in both the objective function (e.g., mean squared error, cross-entropy cost function, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also, consequently, the alteration of the neural network 300 may be small in any given iteration. Back propagation algorithms may need to be repeated many iterations to perform accurate learning as a result of the necessitated smallness of any given iteration.

For example, neural network 300 may have untrained weights and biases, and back propagation may involve the stochastic gradient descent to train the network over a subset of training inputs (e.g., a batch of 10 training inputs from the entirety of the training inputs). Continuing the example, neural network 300 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.).

Figure 4:
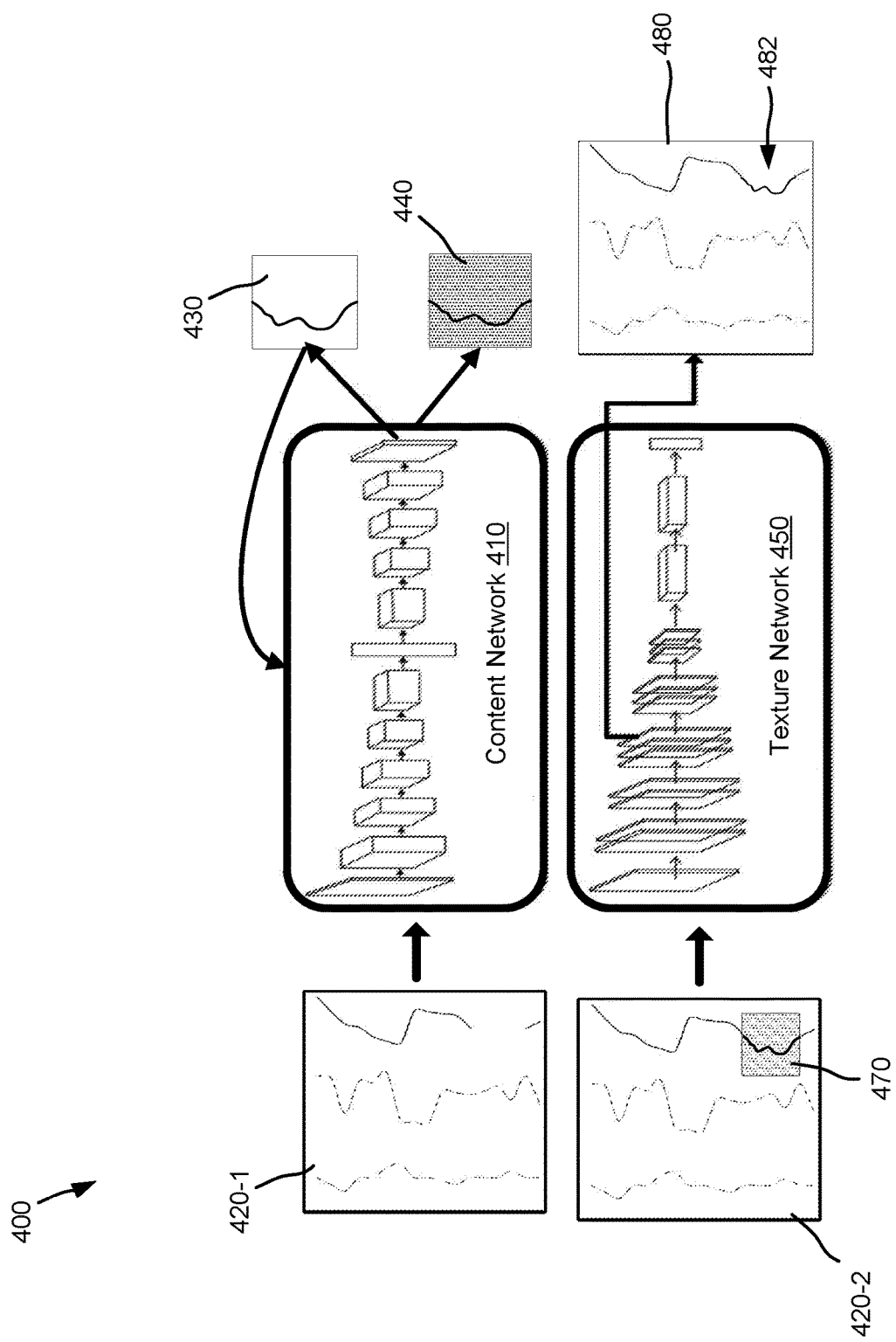
FIG. 4 depicts an example inpainting algorithm of an IWG, consistent with some embodiments of the disclosure.

FIG. 4 depicts an example inpainting algorithm 400 of an IWG, consistent with some embodiments of the disclosure. The inpainting algorithm 400 may operate to create fine textures and high-frequency details of natural images (e.g., well log curves that naturally represent missing values with found depictions for the missing portions of the image without artifacts). The inpainting algorithm 400 may capture or define a neural style of an image and import that neural style to another image. The inpainting algorithm 400 may include the operation of multiple neural networks, such as multiple instances of model 300. Each instance may be configured to perform a separate function and the results may be combined.

A first neural network instance (first instance) 410 may be a content network. The first instance 410 may be trained on training data. The first instance 410 may be trained for content prediction. The first instance 410 may be a network that is solving for the holistic content loss. The first instance 410 may be given as a first instance of input 420-1 (input 420) as well as compared to the preferred output 430 to train the first instance. The input 420 may be a well log with a missing portion depicting a gap in a line visually. The preferred output 430 may be the missing portion of input 420. The first instance 410 may be configured to train around a global structure constraint that captures the semantics and the global structure of a given image. The first instance 410 may generate a final output 440.

The second neural network instance (second instance) 450) may be a texture network. The texture network of the second instance 450 may be pre-trained with training data. For example, the second instance 450 may be trained using a VGG network (e.g., Visual Geometry Group Very Deep Convolutional Network) of pre-trained texture and image data. The second instance 450 may be configured to train around a fine detail missing in the hole or visual gap and a similarity to the fine details that are outside of the region or section that has the gap. For example, given the final output 440 of the first instance 410 and given a second instance of input 420-2 (alternatively, input 420) the second instance 450 may be configured to generate output 480. Given output 480 may have a similar fine detail in the added region 482 as in the other surrounding areas of given output 480. For example, the entirety of given output 480 including the added region 482 may include similarities in texturing, repeating or continuous patterns, an overall cohesive visual style, and the like.

Figure 5A:
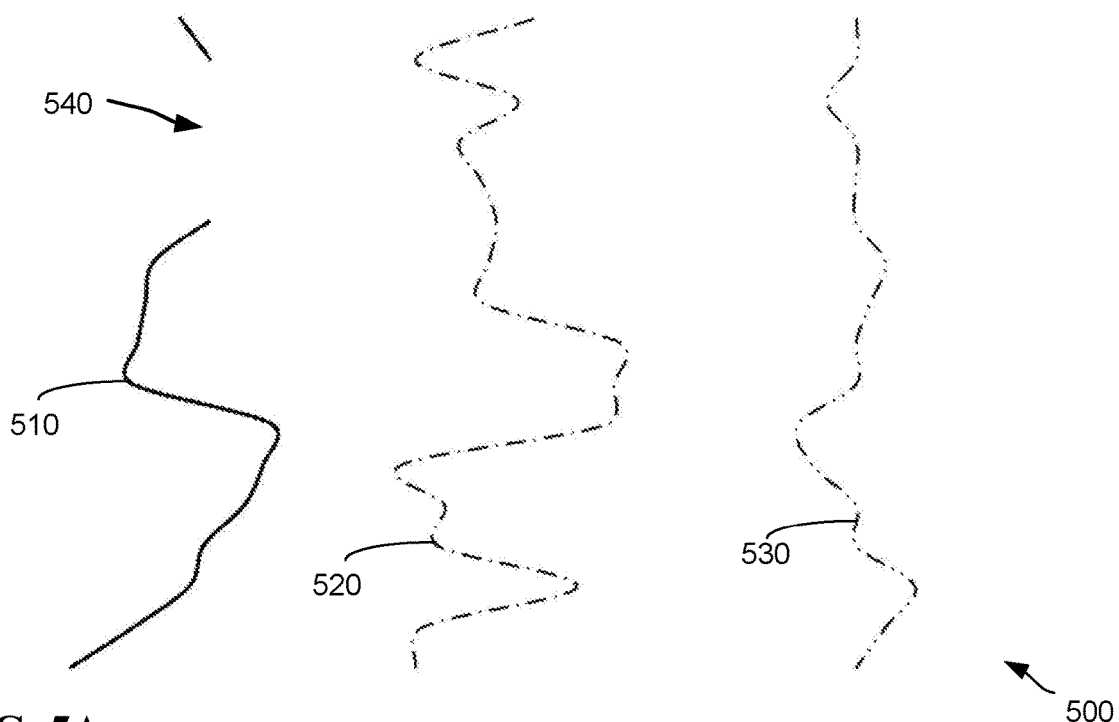
FIG. 5A depicts an example well log image before being inpainted, consistent with some embodiments of the disclosure.

FIG. 5A depicts an example well log image 500 before being visually filled with image analysis techniques, consistent with some embodiments of the disclosure. The well log image 500 may be a visual depiction of a well log that was generated by an IWG. For example, log curve generator 240 may have rendered one or more dimensions from a well log to create well log image 500. The well log may have three dimensions that describe three features numerically.

Table 1 includes the numerical values of the three dimensions of the well log. The log curve generator 240 may plot the values of the well log by directly plotting the values in an unmodified form. The log curve generator 240 may plot the values by offsetting the values of a given dimension of the well log. Specifically, the log curve generator 240 may alter the values of a given dimension such that the scale of the graph is similar visually (e.g., each well log curve falls next to another well log curve and visually extends the same height). Other relevant techniques may be performed, such as multiplication, division, addition of number, shifting of bits, and the like.

TABLE 1

| Depth | Gamma Ray | Porosity | Relative Density |
|---|---|---|---|
| 365 ft | 3.994 | .63 | 0.055 (kg/m$^3$) |
| 365.5 ft | 6.006 | .55 | 0.059 (kg/m$^3$) |
| 366 ft |  | .62 | −1.951 (kg/m$^3$) |
| 366.5 ft |  | .58 | 0.031 (kg/m$^3$) |
| 367 ft |  | .595 | 0.017 (kg/m$^3$) |
| 367.5 ft | 5.916 | .705 | 0.003 (kg/m$^3$) |
| 368 ft | 2.206 | .60 | 2.007 (kg/m$^3$) |
| 368.5 ft | 1.631 | .595 | 1.012 (kg/m$^3$) |
| 369 ft | 1.106 | .69 | 0.016 (kg/m$^3$) |
| 369.5 ft | 0.668 | .685 | 0.056 (kg/m$^3$) |
| 370 ft | 10.215 | .68 | −3.939 (kg/m$^3$) |
| 370.5 ft | 9.647 | .54 | −2.935 (kg/m$^3$) |
| 371 ft | 8.375 | .57 | 0.048 (kg/m$^3$) |
| 371.5 ft | 5.586 | .565 | 0.053 (kg/m$^3$) |
| 372 ft | 4.637 | .66 | 4.057 (kg/m$^3$) |
| 372.5 ft | 0.921 | .555 | 2.055 (kg/m$^3$) |
| 373 ft | −3.392 | .55 | 0.052 (kg/m$^3$) |

The well log image 500 may contain a first well log curve 510, a second well log curve 520, and a third well log curve 530. The first well log curve 510 may correspond to the Gamma Ray values of the first dimension of Table 1. The first well log curve 510 may have a missing section (visually depicted as the area 540 between the two portions of well log curve 510). The second well log curve 520 may correspond to the Porosity values of the second dimension of Table 1. The third well log curve 530 may correspond to the Relative Density values of the third dimension of Table 3. The Gamma Ray values of the first dimension of Table 1 may be incomplete (e.g., missing values located in Table 1 column 2) represented by visual gap 540.

Figure 5B:
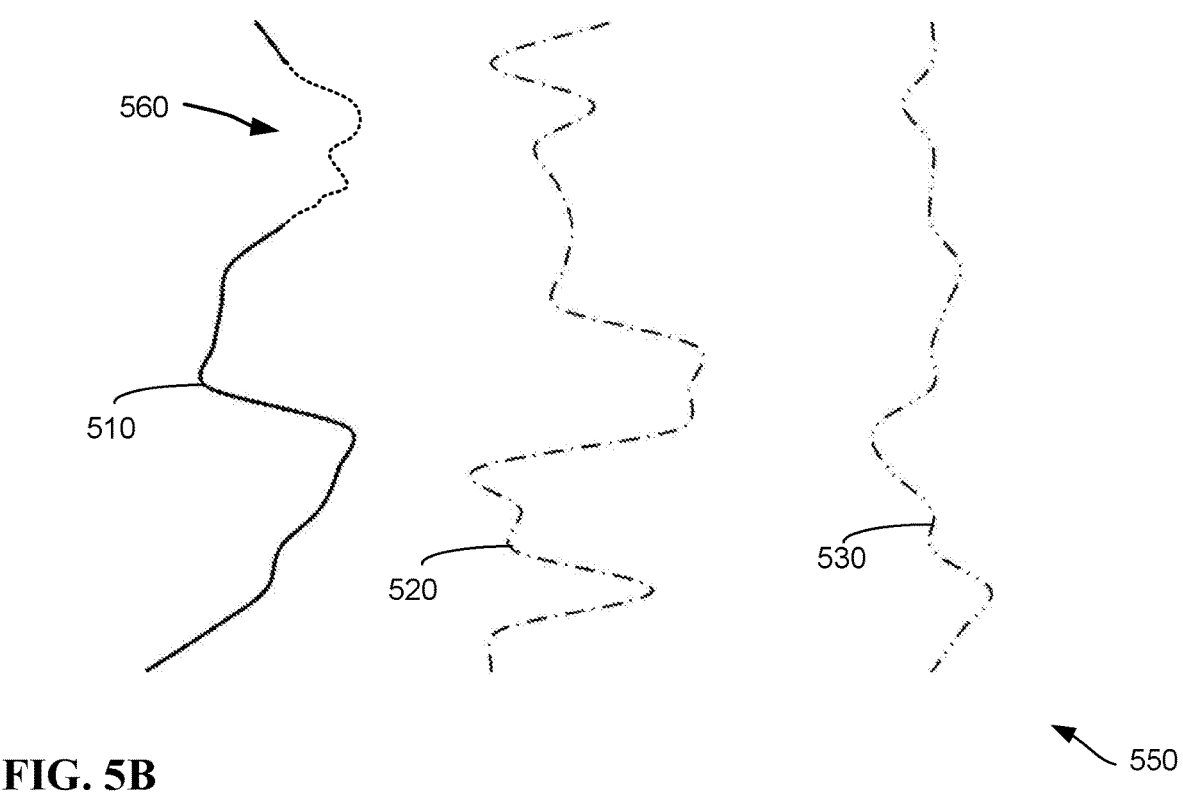
FIG. 5B depicts an example well log image created based on inpainting, consistent with some embodiments of the disclosure.

FIG. 5B depicts an example well log image 550 created based on visual reconstruction based on image analysis techniques, consistent with some embodiments of the disclosure. The well log image 550 may be a visual depiction of a well log that was created by an IWG. For example, log curve generator 240 may have created the well log curves from the dimensions of Table 1. Neural network 270 may perform one or more image analysis algorithms to create well log image 550 by visually depicting a found depiction 560. For example, neural network 270 may perform inpainting to visually fill, complete, reconstruct, or otherwise visually recreate well log image 550. Neural network 270 may visually recreate the entirety of first well log curve 510 without having access to the numerical values in Table 1. Specifically, neural network 470 may only have access to the pixel data of the log image 550 and may only be based on the pixel data and based on the trained weights and biases perform the inpainting.

Figure 6:
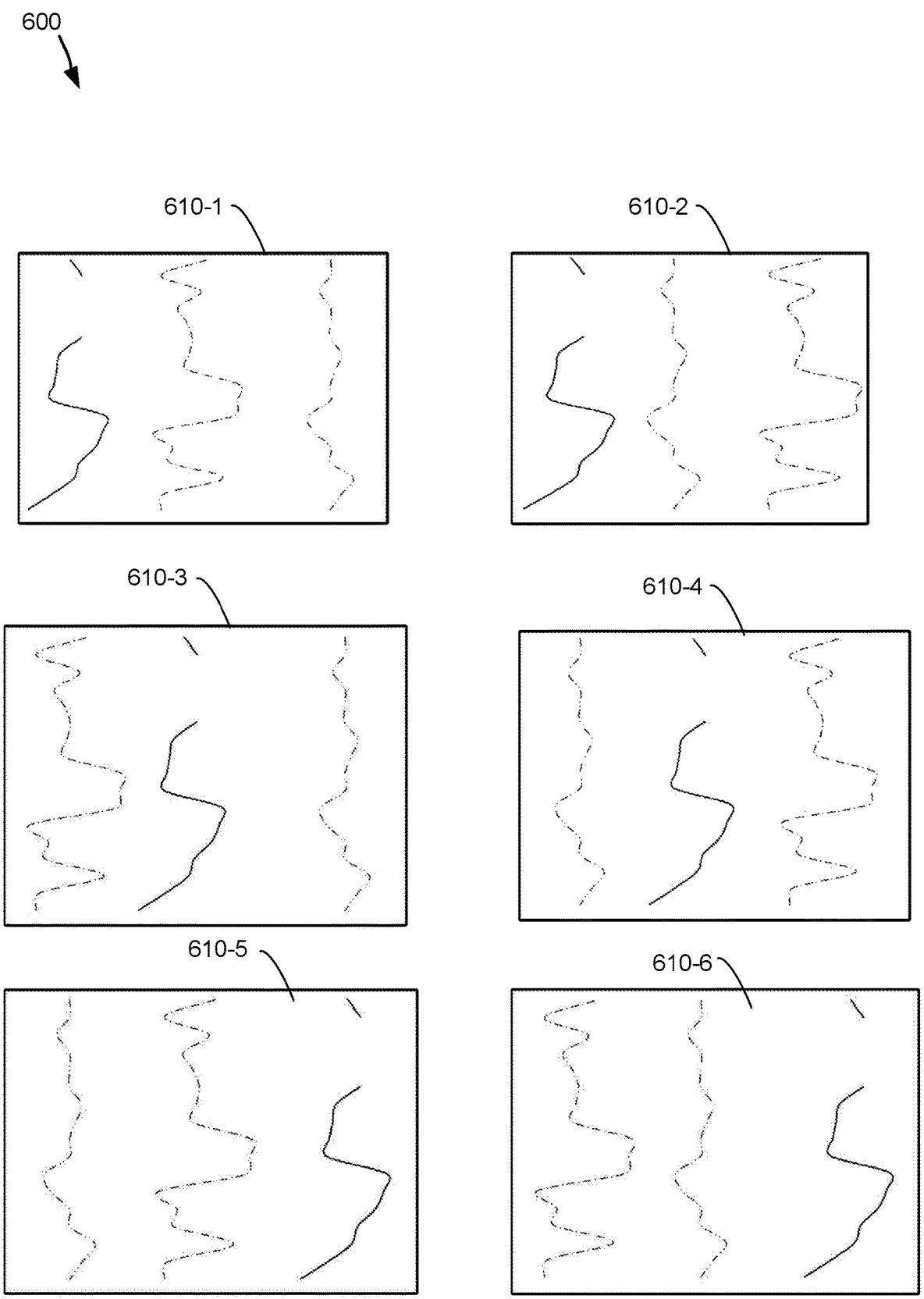
FIG. 6 depicts a set of training data generated by an IWG, consistent with some embodiments of the disclosure.

FIG. 6 depicts a set of training data 600 generated by an IWG, consistent with some embodiments of the disclosure. The IWG may generate the set of training data 600 based on a single well log. The training data 600 may include images 610-1, 610-2, 610-3, 610-4, 610-5, and 610-6 (collectively, 610).

The images 610 of the training data may be permutations of a well log. For example, given Table 1, image 610-1 may be generated with log curves occurring in the same order as the corresponding dimensions occur in Table 1. The other images may be permutations of the order. For example, image 610-2 may be generated by reordering (by log curve generator 240) the plotting to plot the first dimension, then the third dimension, and then the second dimension. For each permutation, the log curve generator 240 may generate an image 610 for use by neural network 270 as training data. Consequently, neural network 270 may use the generated images as training data to provide a number of outputs. Each output may be a visually filled in section of the visual gap that represents the missing values of a dimension. As a neural network may have reduced accuracy, the image analysis engine 250 may perform operations to identify, based on image processor 260, each filled in log curve of the neural network 270 and temporarily store each curve with the visually filled in section. The image analysis engine 250 may later average each output of the found depictions that were temporarily stored to increase the accuracy of the visual curve of the found depiction.

Figure 7:
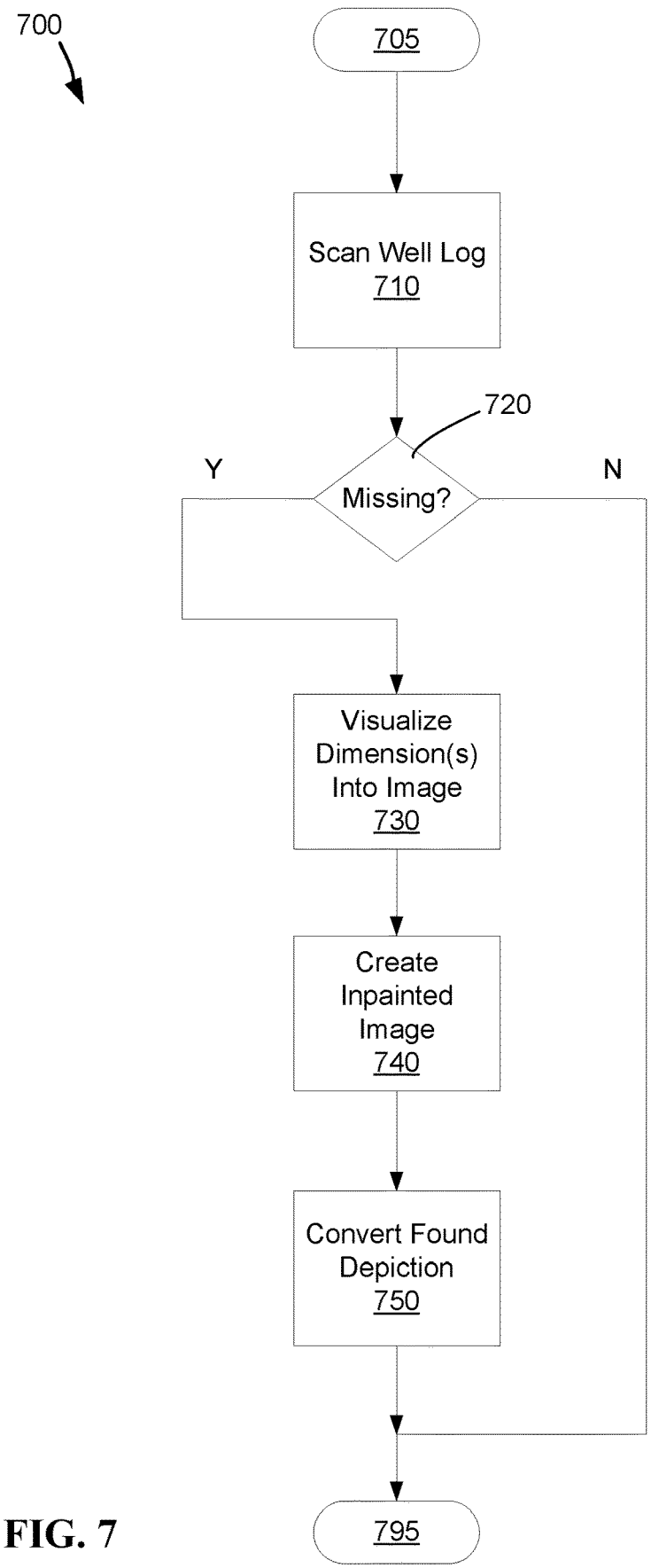
FIG. 7 depicts an example method of filling in missing well log data using an IWG, consistent with some embodiments of the disclosure.

FIG. 7 depicts an example method 700 of filling in missing well log data using an IWG, consistent with some embodiments of the disclosure. Method 700 may be performed by a computer, such as computer system 100. Method 700 begins at 705, by scanning for one or more dimensions of a well log at 710. The scanning of dimensions may be performed by a component of an IWG, such as the log curve generator 240. The scanning of dimensions may be performed by reading the data of the well log. The well log may be in a numerical format, and the scanning may be based on reading the numerical values of the dimensions in the well log.

The scanning, at 710, may be scanning for one or more missing values in the dimensions of the well log. If a missing value is found, at 720:Y, then the dimension of the well log may be visualized into an image at 730. The visualizing of the dimensions may include transforming the dimensions into an image (e.g., plotting, graphing, rendering). The transforming of the dimensions may be performed by an IWG component, such as log curve generator 240. The transforming of the dimension may include transforming just the dimension that has a missing value. In some embodiments, the well log may have multiple missing values of a single dimension and the transforming may include transforming just the single dimension with the missing values. In some embodiments, the well log may have multiple missing values across multiple dimensions and the transforming may include transforming all the dimensions that have missing values. In some embodiments, the transforming may include transforming all of the dimensions, regardless of any given dimension being the dimension in which a given missing value of detected. The image created by transforming the well log numerical data may be a visual representation of the data. The visual representation may visually depict one or more of the dimensions including the dimension with the missing value. The missing value may be depicted as an absence, gap, or visual break in the line that represents the dimension.

At 740, a second image may be created. the second image may be created by an IWG component, such as image analysis engine 250. The second image may be created using an image analysis technique, such as inpainting, based on neural network 270. The second image may have a visual depiction of the line that was missing but with the visual gap filled in. The filling in of the gap may be a found depiction along with the other visual depictions of values that already existed. For example, the second image may be generated such that the line that represents the dimensions no longer has any gap or blank space and the line is continuous from one end to another. The second image may be created by the IWG visually. For example, the neural network 270 may generate the continuous line without having access to any of the numerical values of the well log, and only based on the visual representation of the well log.

The second image may be converted into an updated plurality of numerical values at 750. The second image may be converted by an IWG component, such as image decoder 280. The second image may be converted based on one or more image analysis techniques, such as may be performed by image processor 260. The updated plurality of numerical values may be in the same numerical format as the plurality of numerical values of the well log. Method 700 may end at 795 after converting the second image at 750, or alternatively if a missing value is not found at 720:N.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    scanning a well log for one or more dimensions, the one or more dimensions describe one or more features of a well, each dimension of the well log corresponds to each feature, each dimension includes a plurality of values in a numerical format that numerically represents each dimension;
    detecting, based on the well log, a missing value in a first plurality of values of a first dimension of the well log;
    transforming, in response to the missing value, the first dimension of the well log into a first image, the first image visually depicts the first dimension including the first plurality of values and the missing value;
    creating, based on the first image and based on an image analysis algorithm, a second image, the second image visually depicts the first plurality of values and a found depiction that visually depicts a found value in place of the missing value; and
    converting, based on the second image using image analysis-based well log data generation, the found depiction into a first value, the first value in the numerical format.

2. The method of claim 1, wherein the transforming includes plotting each of the first plurality of values as a first-dimension curve and the missing value as a visual gap in the first-dimension curve.

3. The method of claim 1, wherein the image analysis algorithm is an inpainting algorithm.

4. The method of claim 1, wherein the image analysis algorithm performs inpainting based on a neural network.

5. The method of claim 4, wherein a plurality of historical well logs exists for the well, each historical well log of the plurality of historical well logs describes the one or more features of the well at an earlier time, and wherein the method further comprises:
    transforming, each of the plurality of historical well logs, into a plurality of training images; and
    training, based on the plurality of training images, the neural network.

6. The method of claim 4, wherein a plurality of historical well logs does not exist for the well, and wherein the method further comprises:
   generating, based on the well log, a training data set; and
   training, based on the training data set, the neural network.

7. The method of claim 6, wherein the generating the training data set comprises:
   determining, based on the well log, a number of permutations of the one or more dimensions;
   generating, for each of the number of permutations, a plurality of arrangements of the one or more dimensions; and
   transforming, for each arrangement of the plurality of arrangements, the plurality of dimensions of a given arrangement into a training image of the plurality of training images.

8. The method of claim 7, wherein the method further comprises:
   identifying, for each training image of the plurality of training images, an inpainted section; and
   averaging, based on the identifying, each of the identified inpainted sections.

9. The method of claim 1, wherein the transforming includes transforming the one or more dimensions other than the first dimension into the first image, and wherein the first image visually depicts the one or more dimensions.

10. The method of claim 9, wherein the method further comprises:
    performing a second image analysis algorithm to identify the first plurality of values and the found depiction.

11. A system comprising:
    a memory, the memory containing one or more instructions; and
    a processor, the processor communicatively coupled to the memory, the processor, in response to reading the one or more instructions, configured to:
      scan a well log for one or more dimensions, the one or more dimensions describe one or more features of a well, each dimension of the well log corresponds to each feature, each dimension includes a plurality of values in a numerical format that numerically represents each dimension;
      detect, based on the well log, a missing value in a first plurality of values of a first dimension of the well log;
      transform, in response to the missing value, the first dimension of the well log into a first image, the first image visually depicts the first dimension including the first plurality of values and the missing value;
      create, based on the first image and based on an image analysis algorithm, a second image, the second image visually depicts the first plurality of values and a found depiction that visually depicts a found value in place of the missing value; and
      convert, based on the second image using image analysis-based well log data generation, the found depiction into a first value, the first value in the numerical format.

12. The system of claim 11, wherein the transforming includes plotting each of the first plurality of values as a first-dimension curve and the missing value as a visual gap in the first-dimension curve.

13. The system of claim 11, wherein the image analysis algorithm is an inpainting algorithm.

14. The system of claim 11, wherein the transforming includes transforming the one or more dimensions other than the first dimension into the first image, and wherein the first image visually depicts the one or more dimensions.

15. The system of claim 14, wherein the processor is further configured to:
    perform, a second image analysis algorithm, to identify the first plurality of values and the found depiction.

16. A computer program product, the computer program product comprising:
    one or more computer readable storage media; and
    program instructions collectively stored on the one or more computer readable storage media, the program instructions configured to:
      scan a well log for one or more dimensions, the one or more dimensions describe one or more features of a well, each dimension of the well log corresponds to each feature, each dimension includes a plurality of values in a numerical format that numerically represents each dimension;
      detect, based on the well log, a missing value in a first plurality of values of a first dimension of the well log;
      transform, in response to the missing value, the first dimension of the well log into a first image, the first image visually depicts the first dimension including the first plurality of values and the missing value;
      create, based on the first image and based on an image analysis algorithm, a second image, the second image visually depicts the first plurality of values and a found depiction that visually depicts a found value in place of the missing value; and
      convert, based on the second image using image analysis-based well log data generation, the found depiction into a first value, the first value in the numerical format.

17. The computer program product of claim 16, wherein the image analysis algorithm performs inpainting based on a neural network.

18. The computer program product of claim 17, wherein a plurality of historical well logs exists for the well, each historical well log of the plurality of historical well logs describes the one or more features of the well at an earlier time, and wherein the program instructions are further configured to:
    transform, each of the plurality of historical well logs, into a plurality of training images; and
    train, based on the plurality of training images, the neural network.

19. The computer program product of claim 17, wherein a plurality of historical well logs does not exist for the well, and wherein the program instructions are further configured to:
    generating, based on the well log, a training data set; and
    training, based on the training data set, the neural network.

20. The computer program product of claim 19, wherein the generating the training data set comprises:
    determine, based on the well log, a number of permutations of the one or more dimensions;
    generate, for each of the number of permutations, a plurality of arrangements of the one or more dimensions; and
    transform, for each arrangement of the plurality of arrangements, the plurality of dimensions of a given arrangement into a training image of the plurality of training images.

* * * * *